United States Patent
Hanai et al.

(10) Patent No.: US 6,327,417 B1
(45) Date of Patent: Dec. 4, 2001

(54) APPARATUS AND METHOD FOR RECONSTRUCTING A TAPE LIBRARY CONTAINING PROGRAM INFORMATION CORRESPONDING TO PROGRAMS RECORDED ON A MAGNETIC TAPE

(75) Inventors: Tomoyuki Hanai, Kanagawa; Yasutomo Nishina, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/051,522

(22) PCT Filed: Aug. 12, 1997

(86) PCT No.: PCT/JP97/02820

§ 371 Date: Apr. 13, 1998

§ 102(e) Date: Apr. 13, 1998

(87) PCT Pub. No.: WO98/07158

PCT Pub. Date: Feb. 19, 1998

(30) Foreign Application Priority Data

Aug. 13, 1996 (JP) ................................................ 8-229413

(51) Int. Cl.[7] ............................... H04N 5/76; H04N 5/92
(52) U.S. Cl. ................................................. 386/46; 386/83
(58) Field of Search ......................... 386/1, 46, 83; 360/69, 72.1, 72.2

(56) References Cited

U.S. PATENT DOCUMENTS 5,488,409 * 1/1996 Yuen et al. ............................. 386/83
5,949,954 * 9/1999 Young et al. ........................... 386/83
6,091,884 * 7/2000 Yuen et al. ............................. 386/83

FOREIGN PATENT DOCUMENTS 62-279582   12/1987   (JP) .
4-245083     9/1992   (JP) .
5-81773      4/1993   (JP) .

* cited by examiner

*Primary Examiner*—Thai Tran
*Assistant Examiner*—Polin Chieu
(74) *Attorney, Agent, or Firm*—Frommer Lawrence & Haug LLP; William S. Frommer

(57) ABSTRACT

A recording program information managing apparatus and method for managing programs recorded on a magnetic tape. Superimposed on a magnetic tape is program information pertaining to a plurality of magnetic tapes, the programs recorded on the magnetic tapes and the addresses of the recorded programs, as well as, any other additional information needed for management of magnetic tapes. The program information is additionally stored in a tape library for managing the recorded programs. If a device mistakenly assigns non-corresponding program information to a particular tape, the management of the recorded programs on the particular tape becomes difficult. The system, therefore, compensates for any errors by reconstructing the tape library to link the program information superimposed on a recording medium with newly established program information in the tape library. Thereby allowing the tape library to contain corresponding program information.

14 Claims, 11 Drawing Sheets

RECONSTRUCTION DATA ASSOCIATED TABLE

| STORED DATA | → | RECONSTRUCTED DATA |
|---|---|---|
| RECORDED PROGRAM A | TAPE NUMBER[1]<br>PROGRAM NUMBER[1] | → | TAPE NUMBER[R1]<br>PROGRAM NUMBER[R1] |
| RECORDED PROGRAM B | TAPE NUMBER[2]<br>PROGRAM NUMBER[1] | → | TAPE NUMBER[R1]<br>PROGRAM NUMBER[R2] |

PROGRAM IDENTIFICATION
INFORMATION

| TAPE NUMBER [1~n] |
|---|
| PROGRAM NUMBER [1~n] |
| DATA (ADDRESS DATA, ETC.) |

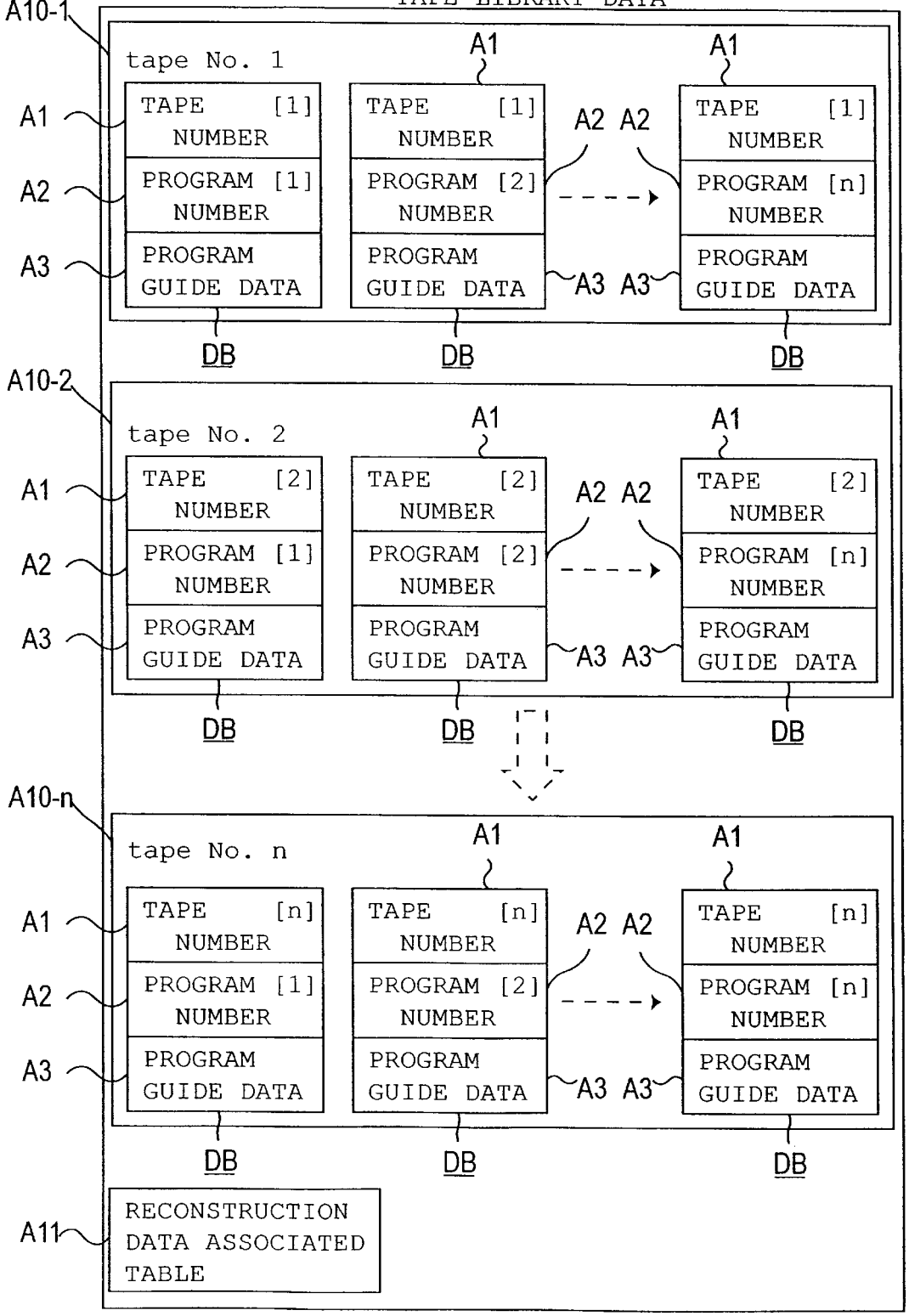

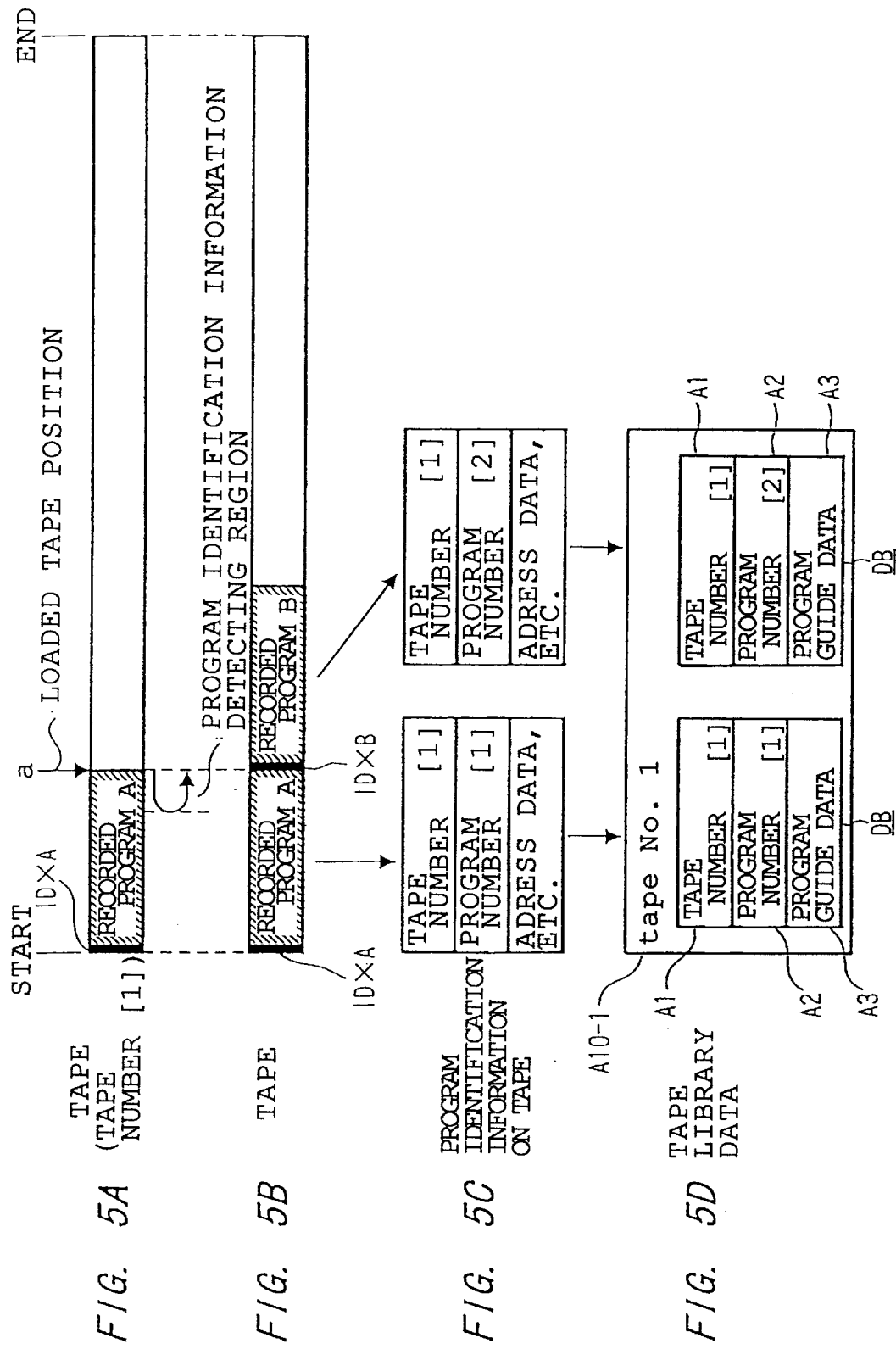

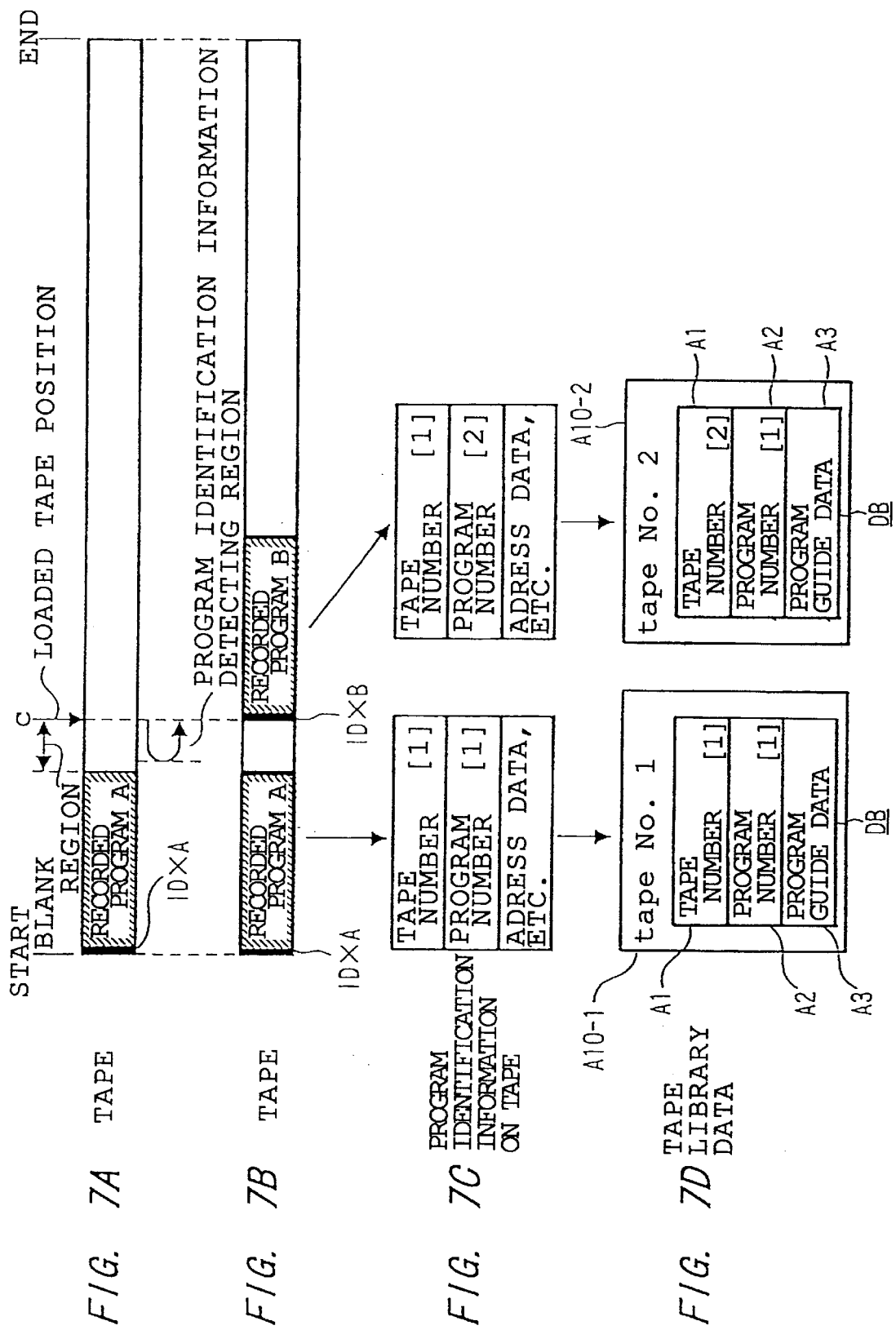

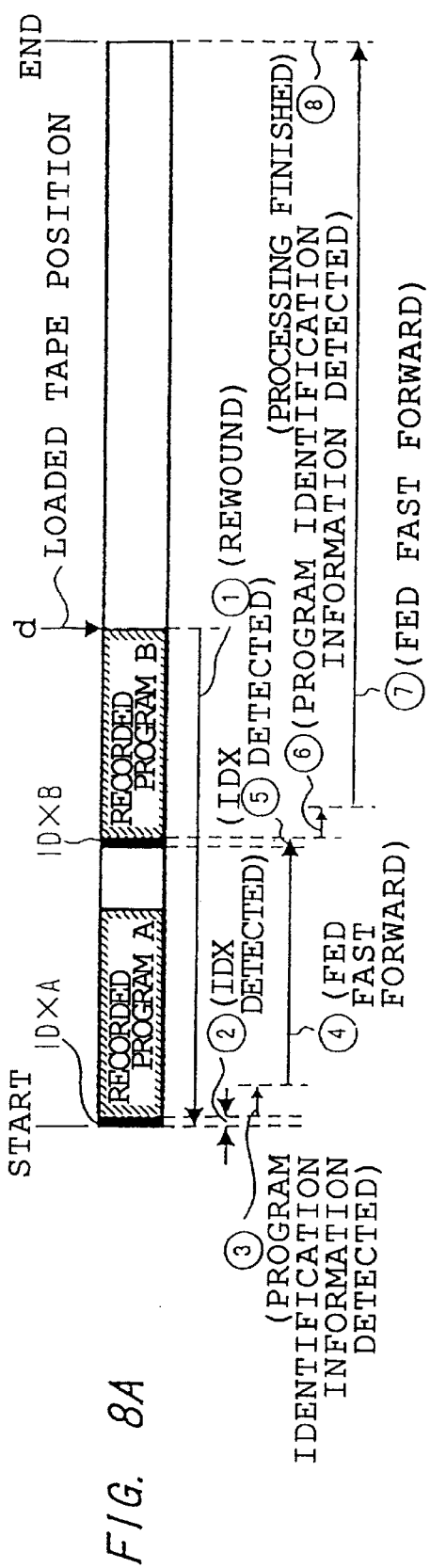

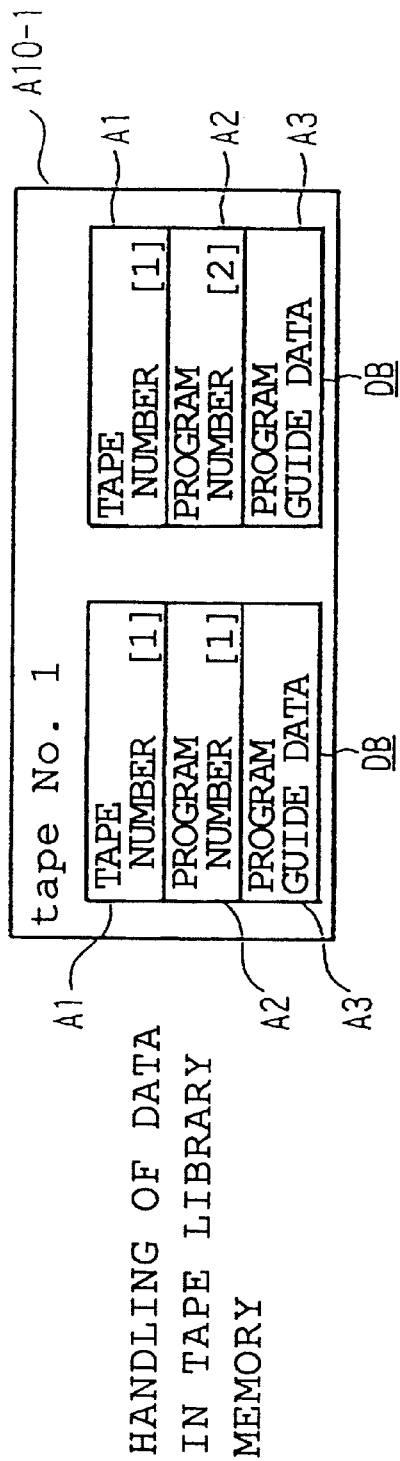
FIG. 8C  HANDLING OF DATA IN TAPE LIBRARY MEMORY

APPARATUS AND METHOD FOR RECONSTRUCTING A TAPE LIBRARY CONTAINING PROGRAM INFORMATION CORRESPONDING TO PROGRAMS RECORDED ON A MAGNETIC TAPE

TECHNICAL FIELD

The present invention relates to a recorded program information managing apparatus and a recorded program information managing method for managing recorded program information of programs recorded on a tape-like recording medium such as a video cassette tape or the like, and a recording and reproducing apparatus and a recording and reproducing method with a recorded program information managing function provided by such a recorded program information managing apparatus and a recorded program information managing method.

BACKGROUND ART

According to one process of providing users with information relative to programs recorded in a video cassette by a VTR (Video Tape Recorder), a recording area dedicated for recorded program information is established on a leading portion of a magnetic tape in the video cassette, and, when necessary, the recording area for recorded program information is played back to obtain recorded program information, which is displayed as a recorded program guide on a monitor screen. The user can see the recorded program information displayed on the monitor screen to recognize contents of programs recorded in the video cassette presently loaded in the VTR, the order in which the programs are recorded, and recording start/end positions (times) on the tape.

With the above method of providing the recorded program guide, however, since recorded program information is recorded on magnetic tapes in video cassettes, the user is required to repeatedly load video cassettes into and eject video cassettes from the VTR until the user finds the particular video cassette in which a desired program that the user wants to see is recorded. Therefore, the user needs to perform a tedious and time-consuming task.

Furthermore, because the recording area for recorded program information is positioned on the leading portion of a video cassette tape, if the video cassette tape has been wound partway, then the user needs a time to rewind the video cassette up to its leading portion in order to see the recorded program information. This also puts the user under stress.

There has been known a process of recording a program by establishing a tape number with which to identify a tape on which the program is recorded and a program number with which to identify the program, storing information of the tape number and the program number in a tape library memory in a VTR in association with given program guide data, and superimposing the information of the tape number and the program number and address information indicative of a tape-like recording position upon a vertical blanking period of the video signal of the recorded program.

In order for the VTR to establish a tape number in recording a program in a tape cassette, the VTR plays back the loaded tape cassette for several seconds. If there is a program which has already been recorded in the tape cassette, the VTR detects a tape number that has been recorded together with the video signal of the recorded program, establishes the same tape number as the detected tape number, and thereafter starts to record the program. If there is no program which has already been recorded in the tape cassette even after the tape cassette has been played back for several seconds, then the VTR regards the tape cassette as a virgin tape cassette, and establishes a new tape number.

To establish a program number, the VTR searches the tape library memory using the tape number detected as described above, determines a program number to be established, and establishes the program number.

With identification information being thus allotted and managed to identify recorded programs, if the tape number of a certain recorded program can be identified when the loaded video cassette is played back for a short period of time, then it is possible to read and display program guide information that has been stored in the tape library memory according to the identified tape number. Therefore, necessary program guide information can be obtained through a playback for a short period of time. In addition, a label marked with a number corresponding to a tape number established by the VTR may be applied to the casing of the tape cassette. When information regarding programs recorded in the tape cassette is displayed on the basis of data stored in the tape library memory, the user can easily recognize the position where a desired program is recorded on the cassette tape.

When the VTR is about to establish a tape number for a certain tape cassette in which programs have already been recorded, if the tape cassette is loaded into the VTR with a blank (unrecorded) tape area positioned at the playback head, then since no recorded programs are detected by a playback started from the blank tape area for several seconds, the VTR decides that the tape cassette is a virgin tape cassette. In this case, the VTR establishes a new tape number, records the established tape number in the video signal of a program, and stores information of the recorded program together with information of the established tape number in the tape library memory. Consequently, though a plurality of programs are recorded on the same video tape, different tape numbers are recorded in their video signals, and these programs are managed as being recorded on different tapes in the tape library data. As a result, the programs actually recorded on the video tape do not match the management data presented as program guide information.

DISCLOSURE OF THE INVENTION

It is an object of the present invention to provide a recorded program guide function that can easily be used by the user, by solving the above problems. Another object of the present invention is to perform memory management as efficiently as possible in managing recorded program information to achieve a match between programs actually recorded on a video tape and management data presented as program guide information.

A recorded program information managing apparatus for managing information relative to programs recorded on tape-like recording mediums, comprises recorded program information establishing means for establishing, as recorded program information, at least recording medium number information indicative of different recording medium numbers assigned respectively to tape-like recording mediums which record programs thereon, and program number information indicative of different program numbers assigned respectively to the recorded programs in depending relation to the recording medium numbers, recording control means for recording, as identification information of the recorded programs, at least the recording medium number information and the program number information which are established by the recorded program information establishing means on the tape-like recording mediums in superimposed relation to video signals of the recorded programs, storage means for storing at least the recording medium number information and the program number information as recorded program information relative to the recorded programs recorded on the tape-like recording mediums, and reconstructing means for executing a reconstruction process to unify and manage the recording medium number information of recorded programs on a single tape-like recording medium if at least different recording medium numbers have already been established with respect to the recorded programs on the single tape-like recording medium.

The reconstructing means comprises reconstructive number establishing means for establishing reconstructive recording medium number information indicative of a reconstructive recording medium number with respect to a tape-like recording medium to be processed by the reconstruction process, identification information extracting means for extracting recording medium number information and program number information with respect to each of recorded programs from video signals reproduced from the tape-like recording medium to be processed by the reconstruction process, storage control means for storing the recording medium number information extracted with respect to each of recorded programs by the identification information extracting means in association with the reconstructive recording medium number information in a reconstructed data area of the storage means, and program information managing means for rewriting the recording medium number information of programs recorded on the tape-like recording medium into the reconstructive recording medium number information by referring to contents stored in the reconstructed data area.

A recorded program information managing method of managing information relative to programs recorded on tape-like recording mediums, comprises a recorded program information establishing step of establishing, as recorded program information, at least recording medium number information indicative of different recording medium numbers assigned respectively to tape-like recording mediums which record programs thereon, and program number information indicative of different program numbers assigned respectively to the recorded programs in depending relation to the recording medium numbers, a recording control step of recording, as identification information of the recorded programs, at least the recording medium number information and the program number information which are established by the recorded program information establishing step on the tape-like recording mediums in superimposed relation to video signals of the recorded programs, a storage step of storing at least the recording medium number information and the program number information as recorded program information relative to the recorded programs recorded on the tape-like recording mediums in a predetermined storage area, and a reconstructing step of executing a reconstruction process to unify and manage the recording medium number information of recorded programs on a single tape-like recording medium if at least different recording medium numbers have already been established with respect to the recorded programs on the single tape-like recording medium.

The reconstructing step comprises a reconstructive number establishing step of establishing reconstructive recording medium number information indicative of a reconstructive recording medium number with respect to a tape-like recording medium to be processed by the reconstruction process, an identification information extracting step of extracting recording medium number information and program number information with respect to each of recorded programs from video signals reproduced from the tape-like recording medium to be processed by the reconstruction process, a storage control step of storing the recording medium number information extracted with respect to each of recorded programs by the identification information extracting step in association with the reconstructive recording medium number information in a reconstructed data area of the storage area, and a program information managing step of rewriting the recording medium number information of programs recorded on the tape-like recording medium into the reconstructive recording medium number information by referring to contents stored in the reconstructed data area.

A recording and reproducing apparatus having recording and reproducing means for recording and reproducing information on and from tape-like recording mediums, comprises recorded program information establishing means for establishing, as recorded program information, at least recording medium number information indicative of different recording medium numbers assigned respectively to tape-like recording mediums which record programs thereon, and program number information indicative of different program numbers assigned respectively to the recorded programs in depending relation to the recording medium numbers, recording control means for controlling the recording and reproducing means to record, as identification information of the recorded programs, at least the recording medium number information and the program number information which are established by the recorded program information establishing means on the tape-like recording mediums in superimposed relation to video signals of the recorded programs, and storage means for storing at least the recording medium number information and the program number information as recorded program information relative to the recorded programs recorded on the tape-like recording mediums, so that information relative to programs recorded on the tape-like recording mediums can be managed.

The recording and reproducing apparatus also has reconstructing means for executing a reconstruction process to unify and manage the recording medium number information of recorded programs on a single tape-like recording medium if at least different recording medium numbers have already been established with respect to the recorded programs on the single tape-like recording medium. The reconstructing means comprises reconstructive number establishing means for establishing reconstructive recording medium number information indicative of a reconstructive recording medium number with respect to a tape-like recording medium to be processed by the reconstruction process, identification information extracting means for extracting recording medium number information and program number information with respect to each of recorded programs from video signals reproduced from the tape-like recording medium to be processed by the reconstruction process, storage control means for storing the recording medium number information extracted with respect to each of recorded programs by the identification information extracting means in association with the reconstructive recording medium number information in a reconstructed data area of the storage means, and program information managing means for rewriting the recording medium number information of programs recorded on the tape-like recording medium into the reconstructive recording medium number information by referring to contents stored in the reconstructed data area.

A recording and reproducing method of recording and reproducing information on and from tape-like recording mediums, comprises a recorded program information establishing step of establishing, as recorded program information, at least recording medium number information indicative of different recording medium numbers assigned respectively to tape-like recording mediums which record programs thereon, and program number information indicative of different program numbers assigned respectively to the recorded programs in depending relation to the recording medium numbers, a recording control step of recording, as identification information of the recorded programs, at least the recording medium number information and the program number information which are established by the recorded program information establishing step on the tape-like recording mediums in superimposed relation to video signals of the recorded programs, and a storage step of storing at least the recording medium number information and the program number information as recorded program information relative to the recorded programs recorded on the tape-like recording mediums in a storage area, so that information relative to programs recorded on the tape-like recording mediums can be managed. The recording and reproducing method also has a reconstructing mode for executing a reconstruction process to unify and manage the recording medium number information of recorded programs on a single tape-like recording medium if at least different recording medium numbers have already been established with respect to the recorded programs on the single tape-like recording medium.

The reconstructing mode comprises a reconstructive number establishing step of establishing reconstructive recording medium number information indicative of a reconstructive recording medium number with respect to a tape-like recording medium to be processed by the reconstruction process, an identification information extracting step of extracting recording medium number information and program number information with respect to each of recorded programs from video signals reproduced from the tape-like recording medium to be processed by the reconstruction process, a storage control step of storing the recording medium number information extracted with respect to each of recorded programs by the identification information extracting means in association with the reconstructive recording medium number information in a reconstructed data area of the storage area, and a program information managing step of rewriting the recording medium number information of programs recorded on the tape-like recording medium into the reconstructive recording medium number information by referring to contents stored in the reconstructed data area.

With the above arrangement, programs recorded on tape-like recording mediums (video cassettes) are managed by using identification data of recording medium numbers and program numbers which are recorded on the tape-like recording mediums with respect to the recorded programs and also identification data of recording medium numbers and program numbers which are stored in the storage means (storage area). When the reconstruction process according to the present invention is carried out, it is possible to unify different recording medium numbers on the same tape-like recording medium to manage the recorded programs thereon even though identification data such as the recording medium numbers superimposed on video signals cannot directly be rewritten subsequently.

According to the reconstruction process, reconstructive recording medium numbers are established, and stored in a dedicated storage area (reconstructed data area) in association with original recording medium numbers. Therefore, recorded programs after their recording medium numbers have been reconstructed can easily be identified simply by referring to the reconstructive recording medium numbers and the original recording medium numbers. Thus, the recorded programs on the tape-like recording medium after their recording medium numbers have been reconstructed can be managed in a unified fashion based on the reconstructive recording medium numbers, making it relatively simple to manage recorded program information.

BRIEF DESCRIPTION OF THE DRAWINGS

FIGS. 4A and 4B are diagrams illustrative of a data structure of tape library data;

FIGS. 5A through 5D are diagrams illustrative of an example of recorded program identification information and stored tape library data when programs are recorded;

FIGS. 7A through 7D are diagrams illustrative of an example of a process of recording programs with different tape numbers assigned thereto in the same video cassette;

FIGS. 8A through 8C are diagrams illustrative of a reconstruction process according to the embodiment together with a procedure thereof;

BEST MODE FOR CARRYING OUT THE INVENTION

An embodiment of the present invention will hereinafter be described with reference to FIG. 1 through FIGS. 9A and 9B.

According to the present embodiment, an electronic program guide display apparatus capable of displaying an electronic program guide based on program table data transmitted in superimposed relationship to a television signal in a certain broadcasting channel is combined with a recording and reproducing apparatus having a recorded program information managing apparatus according to the present invention, thereby providing an electronic program guide display apparatus which can provide recorded program information as an electronic program guide.

The embodiment will be described under the following sequence of headings:
(1. Arrangement of electronic program guide display apparatus according to the embodiment)
(2. Mode transitions of EPN according to the embodiment)
(3. Management of recorded program information)
 (a. Program identification information recorded on a magnetic tape)

(b. Data contents of a tape library memory)
(c. Example of recorded program information constructed upon recording operation)
(d. Example of a process of cueing up and playing back a tape using recorded program information)
(4. Reconstruction process for recorded program information)
(1. Arrangement of Electronic Program Guide Display Apparatus According to the Embodiment)

Figure 1:
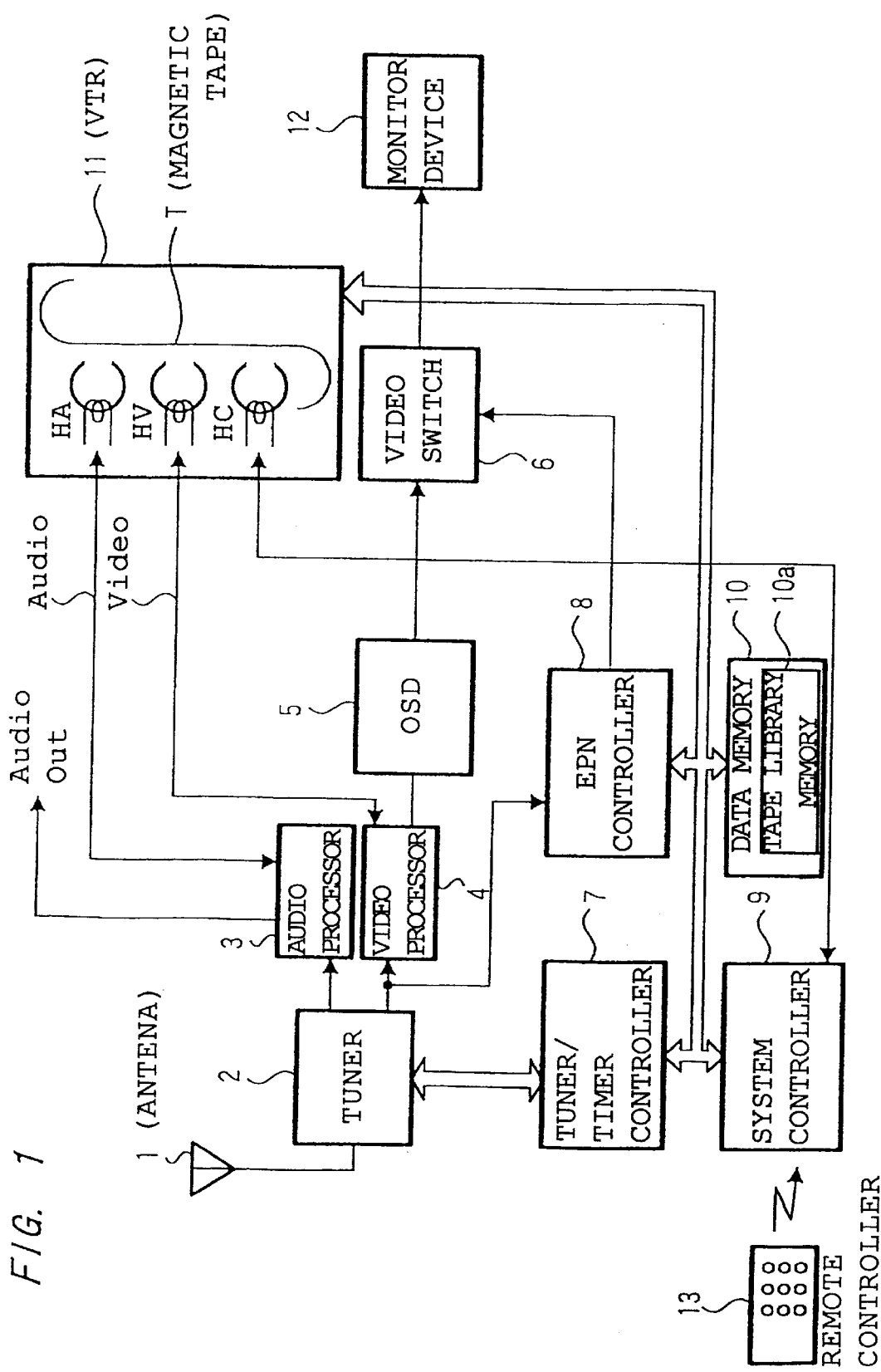
FIG. 1 is a block diagram of an electronic program display control apparatus according to an embodiment of the present invention.

FIG. 1 is a block diagram of an electronic program display control apparatus according to an embodiment of the present invention. In this embodiment, as described above, information of broadcast programs and information of programs recorded in a video cassette by a VTR are displayed as an electronic program guide. Such an electronic program guide will be referred to as an "EPN (Electrical Program Navigator".

In FIG. 1, a broadcast wave received by an antenna 1 is supplied to a tuner 2 which selects a channel to be received. A video signal in the selected channel is supplied to a video processor 4 and an EPN controller 8, and an audio signal in the selected channel is supplied to an audio processor 3.

The audio processor 3 processes the supplied audio signal according to a predetermined signal processing process, and outputs an audio output signal Audio Out. The audio processor 3 is connected to an audio signal recording/playback head HA of a VTR 11. In a recording mode of the VTR 11, the audio processor 3 operates to supply the processed audio signal to the audio signal recording/playback head HA, which records the audio signal on a magnetic tape T in a video cassette. In a playback mode of the VTR 11, the audio processor 3 operates to receive and process an audio signal reproduced from the magnetic tape T by the audio signal recording/playback head HA, and output an audio output signal Audio Out.

The video processor 4 processes the supplied video signal according to a predetermined signal processing process, and outputs a processed video signal to a video signal recording/playback head HV and an on-screen display unit 5.

In the recording mode of the VTR 11, the video processor 4 operates to supply the processed audio signal to the video signal recording/playback head HV, which records the video signal on the magnetic tape T. In the playback mode of the VTR 11, the video processor 4 operates to receive and process a video signal reproduced from the magnetic tape T by the audio signal recording/playback head HV, and output the processed video signal to the on-screen display unit 5.

The on-screen display unit 5 superimposes a video signal representing necessary characters, symbols, etc. upon the video signal supplied from the video processor 4, so that those characters and symbols are superimposed upon an image displayed on a monitor device 12.

A video switch 6 selects or combines an ordinary video signal (a video signal received and selected by the tuner 2 and a video signal reproduced by the VTR 11) which is outputted from the on-screen display unit 5 and an EPN video signal which is outputted from the EPN controller 8 (described later on). According to the present embodiment, the video switch 6 is capable of combining a video signal of an EPN image which is outputted from the EPN controller 8 with a video signal which is outputted from the on-screen display unit 5 for thereby displaying the windows of an EPN image superimposed upon an ordinary image on the display screen of the monitor device 12.

The monitor device 12 displays video signals supplied from the video switch 6.

The VTR 11 records audio and video signals supplied respectively from the audio processor 3 and the video processor 4 on the magnetic tape T in the video cassette respectively with the audio signal recording/playback head HA and the video signal recording/playback head HV. The VTR 11 also reproduces audio and video signals recorded on the magnetic tape T in the video cassette respectively with the audio signal recording/playback head HA and the video signal recording/playback head HV, and supplies the reproduced audio and video signals respectively to the audio processor 3 and the video processor 4.

In the present embodiment, the recording/reproducing mode of the VTR 11 is controlled by a tuner/timer controller 7, and the VTR 11 can be controlled by the tuner/timer controller 7 to record a program received and selected by the tuner 2. The VTR 11 can also be controlled by the tuner/timer controller 7 to program and record a broadcast program (a program received/selected by the tuner 2) based on a designated selected channel and a programmed recording time.

According to the present embodiment, "program identification information", which is identification information to identify recorded programs and has table-of-contents information of recorded programs, is inserted in given positions in video signals of recorded programs, and recorded on the magnetic tape. The program identification information is used as information for recognizing programs recorded on the tape for cueing up and playing back the tape using the EPN and also for carrying out a reconstruction process on the video cassette. The program identification information will be described later on.

The VTR 11 has a control head HC for recording/reproducing a control signal, which is generated on the basis of a vertical synchronizing signal for the purpose of achieving synchronization in the playback mode, in and from a control track on the tape. The control head HC is controlled by a system controller 9 to record an index signal IDX indicative of positions where programs start being recorded in the control track. In this embodiment, the index signal IDX is used to scan recorded programs in cueing up and playing back the tape and also in the reconstruction process for the video cassette. The index signal IDX will be described later on.

The tuner/timer controller 7 serves to control the tuner 2 to select stations and also control the VTR 11 to program timer-controlled program recording, etc.

The EPN controller 8 serves to output an EPN video signal and effect a control process relative to the display of such an EPN video signal.

In this embodiment, a data signal of an electronic program guide which provides guide information relative to broadcast programs is inserted into given horizontal lines in a vertical blanking period of a video signal transmitted from a transmitting station. The EPN controller 8 is supplied with a video signal received/selected by the tuner 2, extracts the data signal of an electronic program guide from the video signal, and decodes the data signal into electronic program guide data. The electronic program guide data thus produced is stored in a data memory 10. When necessary, the EPN controller 8 reads the electronic program guide data (and program identification information, described later on) stored in the data memory 10, generates an EPN video signal from the electronic program guide data, and supplies the EPN video signal to the video switch 6 for thereby displaying an EPN on the monitor device 12.

The system controller 9 comprises a microcomputer, etc. and controls various functional circuits. The system controller 9 has a receiver (not shown) for receiving a remote control signal transmitted from a remote controller 13 and producing command information. Based on the command information, the system controller 9 controls the various functional circuits described above.

The data memory 10 comprises a non-volatile memory or the like, and has an area for storing electronic program guide data relative to broadcast programs which is generated by the EPN controller 8.

In this embodiment, when a broadcast program is recorded by the VTR 11, the EPN controller 8 generates predetermined data regarding the recorded program as a recording event, which is stored in the data memory 10. The data memory 10 has a tape library memory 10*a* as an area for storing program information relative to the recorded program. Program information relative to recorded programs comprises library information of each video cassette. Therefore, the recorded program information will also referred to as "tape library data". Contents of the "tape library data" will be described later on.

The "electronic program guide data" relative to broadcast data and the "tape library data" will hereinafter collectively be referred to as EPN data.

The remote controller 13 has various keys for manipulating the various functional circuits shown in FIG. 1, and transmits command signals corresponding to the keys as they are operated, as infrared or radio-wave signals.

The remote controller 13 has keys, not shown, for effecting various operations on the EPN image as described later on. These keys include an "EPN key", a "command key", "cursor keys" for moving a cursor displayed in the windows of the EPN image in upward, downward, leftward, and rightward directions, entering numerical values, and turning on/off function settings, and an "EXE key" for making decisions (2. Mode Transitions of EPN According to the Embodiment)

Figure 2:
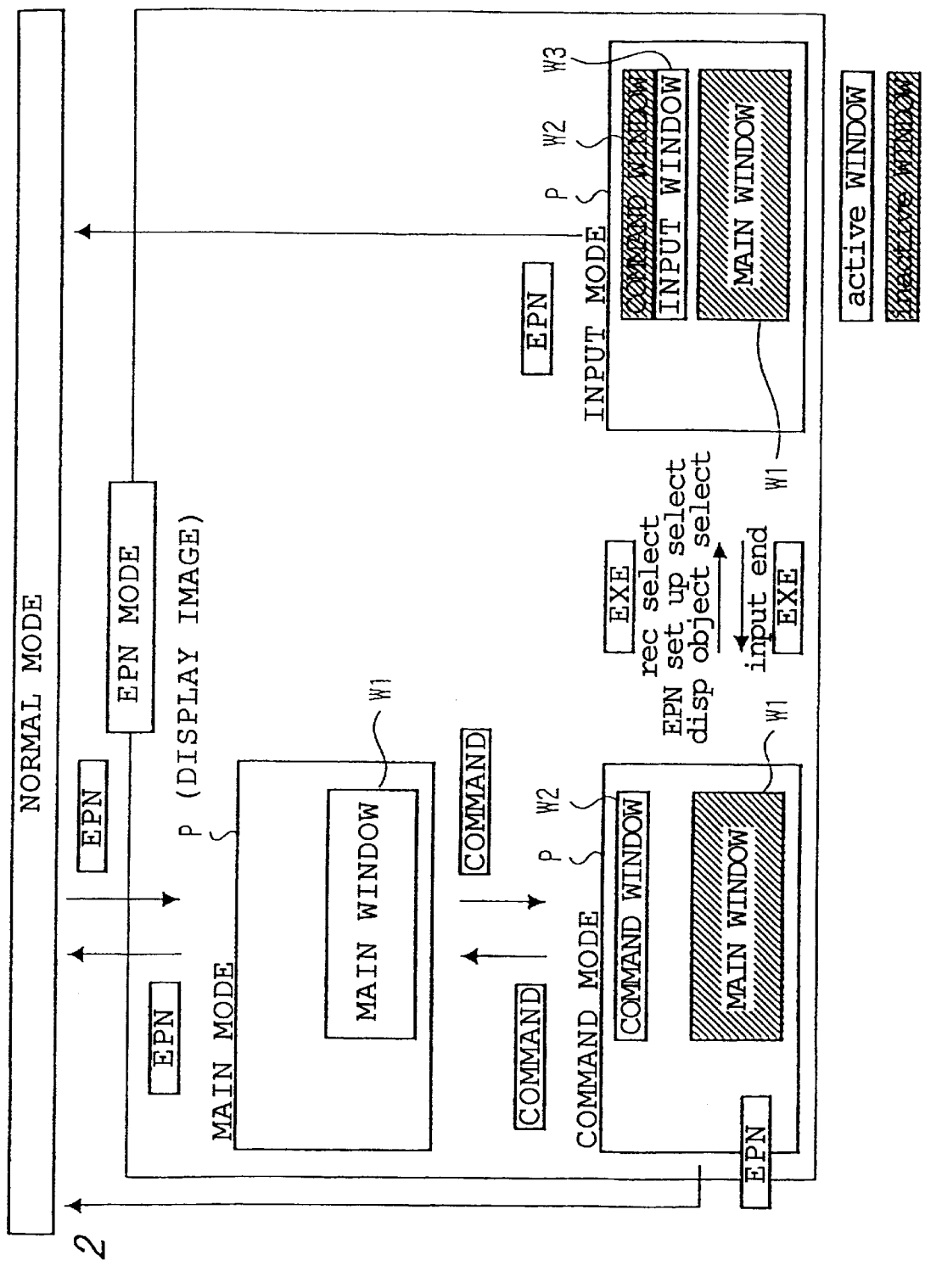
FIG. 2 is a diagram showing mode transitions of EPN according to displayed forms thereof.

Mode transitions of an EPN according to the embodiment will be described below with reference to FIG. 2. FIG. 2 shows mode transitions of an EPN together with the displayed windows of an EPN image.

In FIG. 2, a normal mode is an ordinary display mode for displaying video images received/selected by the tuner 2 as described above or video images reproduced by the VTR 11. In this embodiment, an EPN mode for displaying EPN images is established in addition to the normal mode. The "EPN" key is operated to switch between the normal mode and the EPN mode.

The EPN mode has a MAIN mode, a COMMAND mode, and an INPUT mode.

In this embodiment, when the normal mode switches to the EPN mode with the "EPN" key, the MAIN mode is first selected as shown in FIG. 2.

In the MAIN mode, a MAIN window W1 is displayed in a display image P as shown in FIG. 2. The image displayed in the normal mode, for example, is continuously displayed in the area of the display image P other than the MAIN window W1. Alternatively, a blue background image is displayed in the area of the display image P other than the MAIN window W1.

In the MAIN window W1, there are displayed program information (program information about programs scheduled to be broadcast) of an electronic program guide depending on the display mode and information of programs recorded so far in the video cassette by the VTR 11, according to a display form described later on.

In the MAIN mode, there are established four navigate modes which include, for example, [all channel navigate], [this channel navigate], [all tape navigate], and [this tape navigate] modes.

The [all channel navigate] mode is a mode capable of providing all information about a program being broadcast at present or programs scheduled to be broadcast subsequently. The [this channel navigate] mode is a mode for providing information about a program being broadcast at present or programs scheduled to be broadcast subsequently in a channel that has been designated by a certain operation.

The [all tape navigate] mode is a mode for providing information relative to recorded programs in all video cassettes which have been recorded by the VTR 11, by referring to all tape library data stored in the tape library memory 10*a*. The [this tape navigate] mode is a mode for providing information relative to recorded programs in a video cassette which has been selected by a certain operation among video cassettes which have recorded by the VTR 11.

By switching between the above four navigate modes, the displayed contents of the EPN are changed to switch between a function as an electronic program guide relative to broadcast programs in all channels or a particular channel and a function as an electronic program guide relative to recorded programs in all video cassettes or a particular video cassette which has been recorded by the VTR 11.

Each of the four navigate modes can be selected by selecting a certain command item in a command window W2, described later on, and performing a certain operation.

When the "command key" is operated in the MAIN mode of the EPN mode, the MAIN mode switches to the COMMAND as shown in FIG. 2. In the COMMAND mode, a COMMAND window W2 is displayed in addition to the MAIN window W1. The COMMAND mode is a mode for executing certain designating operations for the EPN. The COMMAND window W2 displays therein various command items for such designating operations.

In the COMMAND mode, as shown in FIG. 2, the MAIN window W1 is shown hatched, and the COMMAND window W2 is shown blank, representing that some display is being made to indicate that the COMMAND window W2 is an active window.

When a certain operation item is selected and the "EXE key" is operated while in the COMMAND mode of the EPN mode, the COMMAND mode switches to the INPUT mode, as shown in FIG. 2. In the INPUT mode, an INPUT window W3 is displayed in addition to the MAIN window W1 and the COMMAND window W2. The INPUT window W3 is an active window as indicated by the INPUT window W3 being shown blank.

The INPUT mode is a mode for entering required parameters belonging to the operation item designated in the COMMAND window W2, for example. The INPUT window W3 displays an image therein for entering such parameters.

When the "EXE key" is operated after the parameters are properly entered in the INPUT mode, the INPUT mode switches to the COMMAND mode.

When the "EPN key" is operated in whatever mode of the EPN mode, the EPN mode returns directly to the normal mode.

(3. Management of Recorded Program Information)
(a. Program Identification Information Recorded on a Magnetic Tape)

An arrangement for managing tape library data as recorded program information in this embodiment will be described below. First, recorded program information to be recorded on a magnetic tape for associating tape library data and programs actually recorded in the video cassette with each other will be described below.

Figures 3A, 3B:
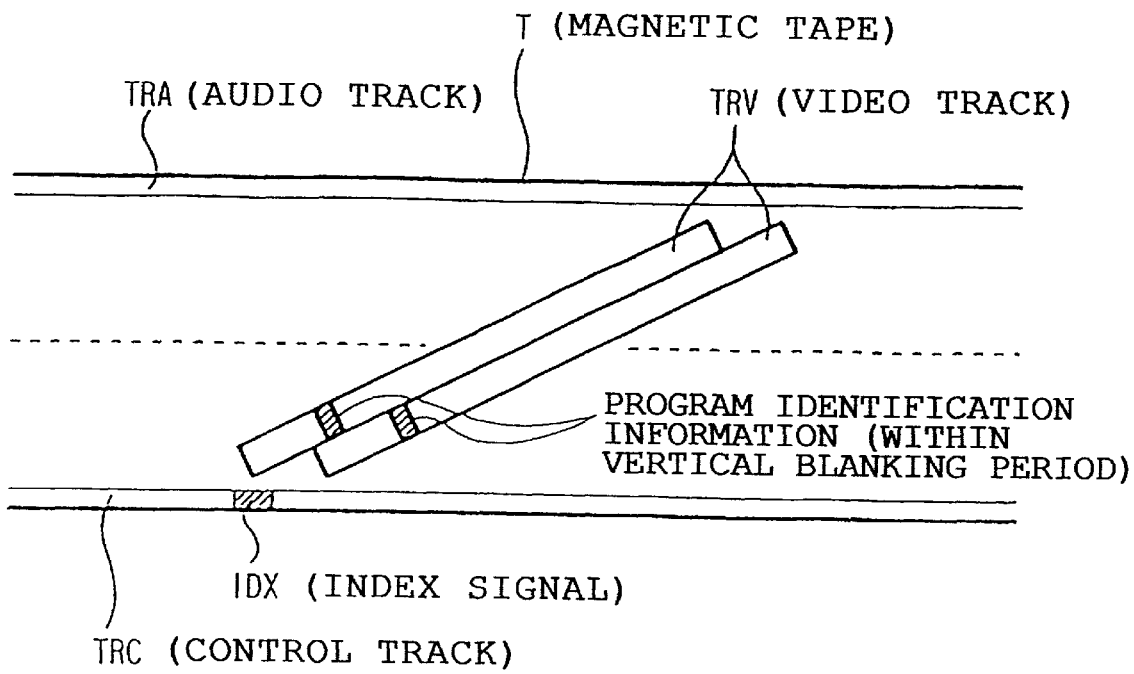
FIGS. 3A and 3B are diagrams illustrative of a recording format of program identification information on a magnetic tape.

FIG. 3A conceptually shows an example of a recording format on a magnetic tape T in the VTR 11 according to the embodiment.

As shown in FIG. 3A, an audio track TRA on which an audio signal is recorded is formed along an upper edge of the magnetic tape T by the audio signal recording/playback head HA (FIG. 1), which is a fixed head, in the recording mode. Video tracks TRV on which a video signal is recorded are formed obliquely successively on the magnetic tape T by the video signal recording/playback head HV (FIG. 1), which is a rotating head, during helical scan in the recording mode. A control track TRC in which a control signal is recorded is formed along a lower edge of the magnetic tape T by the control head HC (FIG. 1), which is a fixed head.

In this embodiment, data of program identification information is recorded in given horizontal lines (for example, lines 10–20) in a vertical blanking period of the video signal. Therefore, program identification information is recorded in portions of the video tracks TRV which correspond to the given horizontal lines in the vertical blanking period.

An index signal IDX indicative of a recording start position is recorded in the control track TRC at a position where the recorded program starts. The index signal IDX is recorded under the control of the system controller 9.

The program identification information is data given for each recorded program, and has its contents as shown in FIG. 3B.

FIG. 3B shows a data structure of program identification information recorded on the magnetic tape T. As shown in FIG. 3B, the data structure of program identification information comprises a tape number area for storing identification data of a tape number, a program number area for storing identification data of a program number, and a data area for storing data such as address data.

Different tape numbers are assigned to respective tape cassettes in which programs have been recorded by the VTR 11, such that the programs are different from each other. Therefore, the tape numbers are data for identifying video cassettes themselves in which programs have been recorded.

Tape numbers are assigned to video cassettes primarily based on such principles that each time the VTR 11 records a virgin tape, a tape number is assigned to the virgin tape. Tape numbers are assigned in an ascending order of [1]–[n]. If necessary, the user may select an arbitrary tape number which has not been used so far, and assign the selected tape number to a virgin tape which is going to be recorded.

Program numbers are assigned respectively to programs in the order in which they are recorded, under the same tape number. Primarily, program numbers [1]–[n] are assigned to respective programs in the order in which the programs are recorded on the same tape.

The maximum tape and program numbers that can be assigned, i.e., the maximum value of the variable n, may be set to arbitrary numbers depending on conditions in which tapes are actually used and the number of bits that can be assigned to their information.

Address data in the data area is data indicative of information, in the form of times, of recording start/end positions on magnetic tapes. If necessary, the data area may contain other types of data in addition to the address data.

In this embodiment, it is possible to identify a recorded program among those programs that have been recorded so far by the VTR 11, by referring to a combination of tape numbers and program numbers, and also to recognize in which order a certain program is recorded in a video cassette to which a tape number is assigned. In addition, it is also possible to recognize recording start/end positions and the length of a recording time on the magnetic tape by referring to the information of the address data.

(b. Data Contents of a Tape Library Memory)

The contents of tape library data stored in the tape library memory 10a will be described below with reference to FIGS. 4A and 4B. Tape library data are formed of recorded program data blocks each representing information of a recorded program. The contents of each recorded program data block can be generated as a recorded event based on the EPN data of a broadcast program to be recorded, by the system controller 9 when the program is recorded by the VTR 11.

Figure 4A:
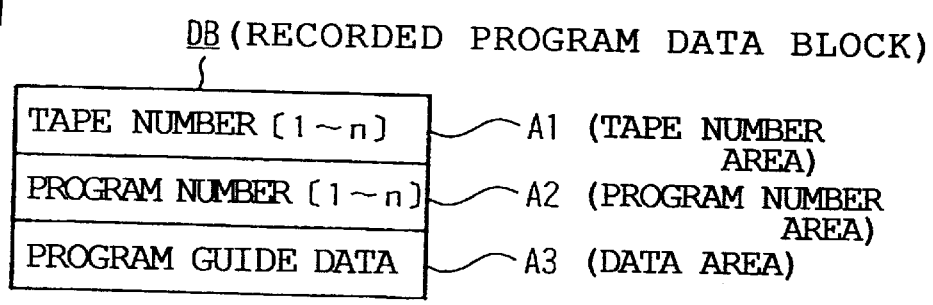

The structure of each of the recorded program data blocks are shown in FIG. 4A. As shown in FIG. 4A, a recorded program data block DB comprises a tape number area A1 for storing the data of the tape number of a video cassette in which a program is recorded, a program number area A2 for storing the data of a program number assigned to the recorded program, and a data area A3 for storing required information (program guide data) relative to the recorded program.

Specific contents of the program guide data to be stored in the data area A3 are not described in detail here. However, for recording a broadcast program, it is possible to generate various items of information including the title of the program as program guide data based on electronic program guide information relative to the broadcast program.

The program guide data include the address data described above with reference to FIG. 3B. Therefore, the data of the recording start/end positions and the length of a recording time of a recorded program on a magnetic tape may be included as information of the program guide data.

FIG. 4B shows the structure of tape library data stored in the tape library memory 10a. As shown in FIG. 4B, tape library data comprises tape associated regions A10-1–A10-n and a reconstruction data associated table A11.

The tape associated regions A10-1–A10-n correspond to video cassettes which have been recorded by the VTR 11 so far and allotted respective tape numbers. For example, if 50 video cassettes have been recorded so far by the VTR 11, then there are 50 tape associated regions A10-1–A10-50. Each of the tape associated regions comprises the recorded program data block DB of a program recorded in one of the video cassettes.

The tape associated region A10-1 corresponding to a video cassette having a tape number [1], for example, will be described below. The tape number areas of recorded program data blocks DB which belong to the tape associated region A10-1 store a value indicative of [1] as a tape number. The program number areas A2 of these recorded program data blocks DB store data indicative of program numbers [1]–[n] of programs that have been actually recorded, in that sequence, in the video cassette which is allotted the tape number [1]. For example, if three programs are actually recorded properly in the video cassette which is allotted the tape number [1], then there are three recorded program data blocks DB in the tape associated region A10-1, and data indicative of program numbers [1]–[3] are stored according to the recorded sequence in the respective program number areas.

Information in the program guide data areas differs depending on the recorded programs corresponding to the respective recorded program data blocks DB.

In the remaining tape associated regions A10-2–A10-n, the tape number areas A1 store respective tape numbers [2]–[n], and the program number areas A2 store data indicative of program numbers [1]–[n] of programs that have been recorded, in that sequence, in the video cassettes which are allotted the respective tape numbers.

The reconstruction data associated table A11, which will be described later on, stores data representing an associated relationship between reconstructive tape numbers and program numbers which have newly been established with respect to recorded programs according to a reconstruction process, described later on, and tape numbers and program numbers which have already been written as tape library data in recorded program data blocks DB.

(c. Example of Recorded Program Information Constructed Upon Recording Operation)

Program identification information on a magnetic tape T and recorded program data blocks DB in the tape library data in the tape library memory 10a, as recorded program information described above, are generated when programs are recorded by the VTR 11, and recorded and written. A process of constructing recorded program information when a program is recorded will be described with reference to FIGS. 5A through 5D.

As shown in FIG. 5A, it is assumed that a program A has already been recorded in a video cassette allotted a tape number [1], from a start position to a position indicated by the arrow a. In this embodiment, an index signal IDX is recorded in the control track at the recording start position, as described above. In FIG. 5A, an index signal IDX·A indicative of the recording start position for the recorded program A has been recorded.

When the user loads the video cassette into the VTR 11 in order to record a new program, it is assumed that the video cassette is loaded with the tape position indicated by the arrow a, i.e., the recording end position for the recorded program A, being positioned at the recording head.

Before starting to record the new program, the VTR 11 slightly rewinds the video cassette and plays back the video cassette for a short time for thereby detecting the program identification information of the last one (in this case, the recorded program A) of any programs that have already been recorded.

The program identification information of the recorded program A has contents as shown in FIG. 5C at the left. A value of [1] is recorded as the tape number. Since the recorded program A is the first program recorded in the video cassette, a value of [1] is recorded as the program number. Address data corresponding to the actual recording start position for the recorded program A is recorded.

Tape library data relative to the recorded program A has already been recorded as a recorded program data block DB as shown in FIG. 5C at the left in the tape library memory 10a. Specifically, the recorded program data block DB of the recorded program A is stored in the tape associated region A10-1 corresponding to the tape number [1]. The tape number area A1 and the program number area A2 store the respective values indicative of the tape number [1] and the program number [1] corresponding to the program identification information, and the data area A3 stores information whose contents depend on the recorded program A.

With the program identification information of the recorded program A being thus obtained, a tape number and a program number in program identification information of a program B to be newly recorded from the position indicated by the arrow a can be set to contents shown in FIG. 5C at the left.

Specifically, since the recorded program A is given the tape number [1], the program B to be recorded on the same tape as the recorded program A is also given the tape number [1]. Furthermore, since the recorded program A is given the program number [1], the program B to be recorded next to the recorded program A is set a program number [2].

The tape number and the program number of the program B are thus established, and the program B starts being recorded from the position indicated by the arrow a as shown in FIG. 5B. First, an index signal IDX·B is recorded in the control track at the recording start position for the program B. Thereafter, data representative of the tape number [1] and the program number [2] and address data are recorded in a superimposed fashion in a predetermined line within a vertical blanking period of the video signal of the recorded program B. The address data represents the present tape position as converted to a time. The address data as it is updated while the recording of the program is in progress is recorded together with the tape number and program number data on the tape.

When the recording of the program B is finished, a recorded program data block DB of the recorded program B is generated as shown in FIG. 5D depending on the contents of the program identification information shown in FIG. 5C at the right, and stored as tape library data.

The contents of the recorded program data block DB of the recorded program B are that values indicative of the tape number [1] and the program number [2] are stored respectively in the tape number area A1 and the program number area A2, as shown in FIG. 5D. If the recorded program B is a broadcast program, then program guide data is generated using data relative to the recorded program B among electronic program guide data transmitted in a superimposed relation to the broadcast signal, and stored in the data area A3. With address data included in the program guide data, information with respect to the recording start/end positions and the length of the recording time of the recorded program B may be included in the program guide data.

The electronic program display control apparatus according to this embodiment can display information relative to programs recorded so far in video cassettes in the EPN mode, as shown in FIG. 2, based on tape library data which have the data structure shown in FIGS. 4A and 4B and generated as shown in FIGS. 5A through 5D. Specific display forms of recorded program information in the EPN mode are omitted from illustration.

(d. Example of a Process of Cueing Up and Playing Back a Tape Using Recorded Program Information)

Figure 6:
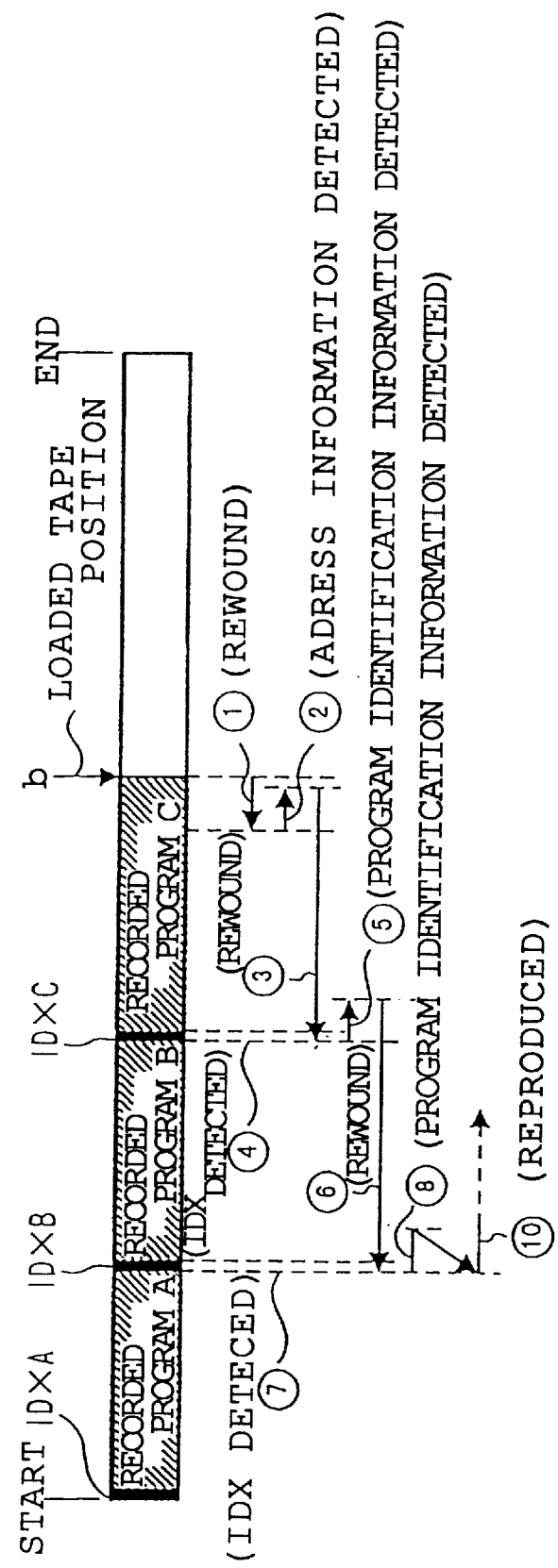
FIG. 6 is a diagram illustrative of an example of a process of cueing up and playing back a magnetic tape in the embodiment.

A process of cueing up and playing back a tape in the VTR 11 in this embodiment using recorded program information (program identification information and tape library data) described above will be described below with reference to FIG. 6. FIG. 6 shows the manner in which a desired recorded program is selected on the basis of an EPN image and the tape is cued up and played back.

In FIG. 6, three programs A, B, C are successively recorded on the magnetic tape in a cassette tape from a tape start position. Tape numbers in the program identification information and tape library data of the recorded programs A, B, C are of a common value (e.g., a tape number [1]), and program numbers are set to values of [1], [2], [3] for the respective recorded programs A, B, C.

For example, the user switches to the MAIN mode in the EPN mode through an operation described above with reference to FIG. 2 and displays the MAIN window W1. The user then selects the [all tape navigate] mode or the [this tape navigate] mode, for thereby displaying the information relative to programs which have been recorded so far by the VTR 11. It is assumed that a desired program which the user wants to see is the program B recorded in the video cassette shown in FIG. 6. The user searches for the recorded program B in the MAIN window W1, using arbitrary search items. The user refers to the tape number of the video cassette which is displayed in the MAIN window W1 and in which the program B is recorded, and loads the tape that is allotted the tape number into the VTR 11. It is assumed that the tape is loaded with the tape position indicated by the arrow b in FIG. 6 (the end position of the recorded program C) being positioned at the playback head.

After the user selects the recorded program B in the MAIN window W1 in the EPN mode through a certain operation, the user switches to the COMMAND mode, and carries out an operation to cue up and play back the tape in the COMMAND window.

Based on the above operation, the system controller 9 controls the VTR 11 to cue up and play back the tape to reproduce the recorded program B according to steps 1–10 described below.

Step 1: The VTR 11 rewinds the tape a predetermined length from the loaded tape position.

Step 2: The VTR 11 plays back the tape a short time (e.g., a few seconds) from the position where the rewinding of the tape is finished, to detect address data among program identification information. When the address data is detected, a present tape position is identified. By comparing the present tape position and the recording start position information of the recorded program B which has been stored in the tape library data, the direction in which to transport the tape is determined for cueing up the recorded program B. In this case, the direction in which to transport the tape is the direction in which the tape is rewound.

Step 3: While rewinding the tape, detection of an index signal IDX recorded in the control track is awaited.

Step 4: First, an index signal IDX·C of the recorded program C is detected.

Step 5: When the index signal IDX·C is detected in the step 4, the VTR 11 plays back the tape for a short time to extract the program identification information (the tape number and the program number) of the recorded program C. The system controller 9 compares the extracted program identification information of the recorded program C with tape number and program number data in the tape library data (the recorded program data block DB) of the recorded program B to be cued up. As a result, the system controller 9 decides that the compared data are not in conformity with each other.

Step 6: When the compared data are not in conformity with each other, the VTR 11 further rewinds the tape, waiting for a next index signal IDX to be detected.

Step 7: An index signal IDX·B of the recorded program B is detected.

Step 8: The VTR 11 plays back the tape for a short time from the position of the index signal IDX·B to extract the program identification information of the recorded program B. The system controller 9 compares the extracted program identification information of the recorded program B with tape number and program number data in the tape library data (the recorded program data block DB) of the recorded program B. The system controller 9 now decides that the compared data are in conformity with each other.

Step 9: The VTR 11 rewinds the tape by the length which has been played back in the step 8, feeding the tape to the start position of the recorded program B.

Step 10: The VTR 11 plays back the recorded program B.

Using the tape number of the program identification information detected in the step 2, it is possible to identify which tape number in the tape library memory the recorded program of the tape number corresponds to. For example, if a cue-up and playback request is issued while a video cassette in which a program to be cued up and played back is not recorded is being loaded, then it is possible to decide that the program to be cued up and played back is not recorded in the presently loaded video cassette.

The presently loaded video cassette will not be cued up and played back, and a message for prompting the user to load a video cassette in which the program to be cued up and played back is recorded may be displayed.

In this embodiment, as described above, since program information relative to recorded programs is stored in the tape library memory 10a, a guide for recorded program information can be displayed without the need for loading a video cassette and playing back its recorded program area.

Tape numbers and program numbers are recorded on magnetic tapes as identification information to identify at least recorded programs, and program guide information relative to the recorded programs are stored in association with the tape numbers and program numbers in the tape library memory 10a. Therefore, by comparing the tape numbers and the program numbers on magnetic tapes and in the tape library data memory 10a, it is possible to cut up and play back a program selected by the user, as described above with reference to FIG. 6.

(4. Reconstruction Process for Recorded Program Information)

Inasmuch as a video cassette physically records information magnetically on the magnetic tape longitudinally therealong, if a plurality of programs are recorded in a single video cassette and recorded program information (program identification information and tape library data) is generated, recorded on the magnetic tape, and stored in the tape library memory 10a, then different tape numbers may possibly be assigned to those programs recorded on the single magnetic tape.

A reconstruction process for recorded program information according to this embodiment is to reconstruct the registration of different tape numbers assigned to plural programs in one video cassette so that these tape numbers will uniformly be handled. A situation in which different tape numbers are registered in a single cassette will be described below with reference to FIGS. 7A through 7D.

FIG. 7A shows that a program A is recorded in a video cassette from a tape start position. It is assumed that the video cassette is presently allotted a tape number [1]. Therefore, the tape number [1] corresponding to the recorded program A is registered in both the program identification information shown in FIG. 5C and the tape library data shown in FIG. 5D. Only the program A has been recorded in the video cassette, and [1] is registered as its program number.

It is assumed that the magnetic tape of the video cassette has been transported for some reason from the end position of the recorded program A to the position indicated by the arrow c in FIG. 7A. When the video cassette is loaded into the VTR 11, the position indicated by the arrow c is the loaded tape position, with a blank tape area being present between the end position of the recorded program A and the loaded tape position.

For recording a new program in the video cassette, the VTR 11 operates to rewind the tape a predetermined length from the position indicated by the arrow c to detect the program identification information of the previously recorded program.

The blank tape area has a width (tape length) greater than the length by which the tape is rewound. Therefore, as shown in FIG. 7A, the blank tape area is played back to detect program identification information, but no program identification information is detected as a matter of course.

When no program identification information is detected, the system controller 9 regards the video cassette as a virgin tape, and establishes a tape number different from the tape number [1] with respect to a program B (see FIG. 7B) to be recorded next. In this case, a tape number [2] is established.

The system controller 9 also regards the program B as a program to be recorded first in a video cassette having the tape number [2], and hence establishes a program number [1] as the program number of the program B.

Since the tape number and the program number of the program B are established in the above manner, the actual program identification information of the programs A, B recorded on the tape are established as shown in FIG. 7C.

Accordingly, tape library data (recorded program data blocks) of the recorded programs A, B have contents as shown in FIG. 7D.

While the programs A, B are recorded in the same video cassette, they are handled as recorded programs having different tape numbers according to the tape library data. Thus, the programs A, B are managed as being recorded in different video cassettes. When the recorded program information is displayed in the EPN mode, the recorded programs A, B are displayed as programs recorded in respective video cassettes having respective tape numbers [1], [2].

Such inconformity between the physically recorded state of programs in video cassettes and the managed state per video cassette of the recorded program information in the electronic program guide display apparatus will result in impairing the ease with which an electronic program guide is used with respect to the recorded programs.

According to this embodiment, the reconstruction process for recorded program information is carried out as described below with reference to FIG. 8 to unify tape numbers for recorded programs that are allotted different tape numbers in a single video cassette, so that those recorded programs can be managed by tape library data as programs recorded in one video cassette.

FIG. 8A illustrates the reconstruction process for recorded program information. In FIG. 8A, programs are recorded in a video cassette in the same manner as the programs recorded in the video cassette as shown in FIG. 7B. The program identification information of the programs A, B recorded on the tape and the contents of the tape library data are the same as those shown in FIGS. 7C and 7D.

Video cassettes which need the reconstruction process to be carried out thereon are identified as follows: When the user sees a program table in an EPN image, the user may notice that the allocation of a tape number to a certain program differs from the user's memory, and recognize the need for the reconstruction process. Alternatively, the system controller of the apparatus may recognize the need for the reconstruction process based on the contents of program identification information per recorded program which is extracted when a scanning process such as a cue-up and playback process is carried out. For example, if the apparatus decides that a video cassette needs the reconstruction process to be carried out thereon, then the apparatus may automatically execute a series of steps of the reconstruction process as described below, or may display an alert message for prompting the user to start the reconstruction process. In the latter case, the user operates a remote controller of the like to execute the reconstruction process to reconstruct recorded program information.

For effecting the reconstruction process, the user first loads a video cassette which the user wants to be reconstructed with respect to recorded program information, into the VTR 11. It is assumed that the video cassette is loaded with the tape position indicated by the arrow d in FIG. 8A (the end position of the recorded program B) being positioned at the playback head. When the user carries out a certain operation to execute the reconstruction process, the system controller 9 thereafter operates to effect steps 1–8 shown in FIG. 8A to execute the reconstruction process. In this case, the reconstruction process is executed with a tape number [1] established for the tape cassette.

1. Since the loaded tape position is a certain position on the tape in the video cassette (the position indicated by the arrow d), the video cassette is rewound to the tape start position.

2. A process of successively detecting index signals IDX of the recorded programs is started while the tape is being fed fast forward from the tape start position. In this case, an index signal IDX·A of the recorded program is immediately detected substantially at the tape start position.

3. After the index signal IDX·A is detected, the recorded program A is played back for a short time to extract program identification information superimposed upon its video signal.

Of the program identification information superimposed upon the video signal of the recorded program A, tape and program numbers are the tape number [1] and the program number [1], respectively, as shown in FIG. 7C. Accordingly, tape and program numbers of the recorded program A which have already been stored as the tape library data are also the tape number [1] and the program number [1], respectively, as shown in FIG. 7D.

As shown in FIG. 8B, the system controller 9 stores the data of the tape number [1] and the program number [1] which have already been established with respect to the recorded program A into an area of "stored data" in the reconstruction data associated table A11.

Then, the system controller 9 newly establishes a tape number [R1] and a program number [R1] as reconstruction data corresponding to the recorded program A, and stores the data of the tape number [R1] and the program number [R1] into an area of "reconstructed data" of an address corresponding to the recorded program A, as shown in FIG. 8B.

"R" assigned to reconstructive number data (R1–Rn) represents a flag which indicates that the number is established according to the reconstruction process. The tape number [R1], for example, indicates that it is established so as to be handled as the tape number [1] according to the reconstruction process. In this manner, an association between "stored data" and "reconstructed data" is obtained with respect to the tape and program numbers of the recorded program A, as shown in FIG. 8B. The flag "R" may actually be established by assigning a predetermined bit pattern to block data having a fixed length of several bits.

4. After the step 3, the tape is fed fast forward to search for a program physically recorded on the tape next to the recorded program A.

5. An index signal IDX·B of the recorded program B is detected as indicating the program B recorded next to the recorded program A.

6. The recorded program B is played back for a short time to extract program identification information superimposed upon its video signal.

Of the program identification information superimposed upon the video signal of the recorded program B, tape and program numbers are the tape number [2] and the program number [1], respectively, as shown in FIG. 7C. Accordingly, tape and program numbers of the recorded program B which have already been stored as the tape library data are also the tape number [2] and the program number [1], respectively, as shown in FIG. 7D.

As shown in FIG. 8B, the system controller 9 stores the data of the tape number [2] and the program number [1] which have already been established with respect to the recorded program B into the area of "stored data" in the reconstruction data associated table A11.

Then, the system controller 9 newly establishes a tape number [R1] and a program number [R2] as reconstruction data corresponding to the recorded program B. The established tape number [R1] is shared with the recorded program A, and the established program number [R2] indicates that the recorded program B will be handled as a recorded program next to the recorded program A (with the program number [R1]).

The system controller 9 stores the data of the tape number [R1] and the program number [R2] into the area of "reconstructed data" of an address corresponding to the recorded program B, as shown in FIG. 8B. In this manner, an association between "stored data" and "reconstructed data" is obtained with respect to the recorded program B, as shown in FIG. 8B.

7. After the step 6, the tape is fed fast forward to search for a program physically recorded on the tape next to the recorded program B.

8. In this case, no recorded program exists after the recorded program B. No new index signal IDX is detected, and the tape is fed fast forward up to the tape end position. When the fast-forward feeding is stopped, the reconstruction process comes to an end. After the step 8, the tape may automatically be rewound to its leading position, whereupon the reconstruction process may be finished.

After the reconstruction process has thus been carried out, the data in the tape library memory will be managed as described below.

For example, for using program guide data of the recorded program A and the recorded program B under EPN display control, the system controller 9 refers to the reconstruction data associated table A11, and reads reconstructed data which corresponds to tape and program number data (corresponding to the contents of the stored data shown in FIG. 8B) of the recorded programs A, B that are actually recorded in the tape number area A1 and the program number area A2 of the tape library data.

The tape library data with respect to the recorded program A and the recorded program B are apparently handled such that the program guide data are associated with the tape and program number data of the reconstructed data read from the reconstruction data associated table A11.

Therefore, the tape library data are managed as shown in FIG. 8C.

Specifically, the tape number areas A of the respective recorded program data blocks DB for the recorded programs A, B store the tape number [R1], indicating that the recorded programs A, B will be handled as programs which are recorded in the video cassette having the tape number [1]. The program number area A of the respective recorded program data blocks DB for the recorded programs A, B store the program numbers [1], [2], indicating that the recorded programs A, B will be handled as programs which are allotted the program numbers [1], [2], respectively, in the video cassette having the tape number [1].

When a program guide is actually displayed as the EPN, the recorded programs A, B are displayed as recorded programs which are allotted the program numbers [1], [2], respectively, in the video cassette having the tape number [1].

For cueing up and playing back a video cassette whose program information has been reconstructed, using the EPN as described above with reference to FIG. 6, the reconstruction data associated table A11 is referred to for identifying tape and program numbers that have actually been registered as stored data with respect to a selected recorded program, and the recorded program with respect to which the identified tape and program numbers are recorded is searched for. In this manner, the recorded program can be cued up and played back without trouble.

In this embodiment, since the program identification information of the recorded programs A, B is recorded in superimposed relation to the video signal thereof, the program identification information has contents as shown in FIG. 7C, and cannot be changed after it has been recorded. However, the established data of the tape and program numbers are associated with the reconstructed data in the reconstruction data associated table A11, and the tape and program numbers of the reconstructed data will subsequently be used to manage the program guide data. Consequently, even if different tape numbers are established with respect to a plurality of recorded programs in a single video cassette, it is possible to unify and manage the tape numbers.

The contents stored in the tape associated regions A10-1–A10-n in the tape library data after the reconstruction process are managed as follows: In the example shown in FIGS. 7A–7D and 8A–8C, the stored contents relative to the recorded programs A, B, which contents are stored when the programs A, B are recorded, as shown in FIG. 7D, become unnecessary after the reconstruction process.

Therefore, the stored contents of the tape library data after the reconstruction process may be managed by erasing the stored contents shown in FIG. 7D and writing the data shown in FIG. 8C instead into the tape library memory. Even though the stored contents of the tape associated regions A10-1–A10-n are rewritten, the program guide as the EPN can accurately be displayed at all times simply by referring to the information stored in the reconstruction data associated table.

According to another reconstruction process different from the reconstruction process in the present embodiment, when it is found that there is a recorded program which is allotted a tape number different from that of the video cassette in which the program is actually recorded, information such as of tape and program numbers that is newly produced by a correction may additionally be stored in a storage area of the same group which stores original tape and program numbers recorded when the program was recorded, and link information may be established and held for linking an address of the storage area which stores the new tape and program numbers and an address of the storage area which stores the original tape and program numbers to each other. In this data management scheme, the data are managed for reconstruction depending on the above link information.

Therefore, if data of one program are reconstructed over and over again because, for example, programs are recorded many times in a superimposed fashion in a single video tape, then the number of storage areas that are linked by link information is so large that the memory management will be burdensome. Inasmuch as the addresses are interlinked by the link information, information about tape and program numbers prior to the latest reconstruction process, which would otherwise be unnecessary, is not erased or rewritten, but continuously held, consuming a memory capacity. Under certain conditions, therefore, a memory of relatively large capacity may be required.

According to the present embodiment, on the other hand, because recorded programs are managed on the basis of reconstructive tape and program numbers independently of original tape and program numbers, even if the reconstruction process is repeated on a certain program, the recorded programs are efficiently managed on the basis of tape and program numbers of reconstructed data. Consequently, the memory management will not be burdensome.

When the reconstruction process is carried out on a certain program at least twice, the contents of the area of reconstructed data in the reconstruction data associated table A11 are rewritten according to reconstructive tape and program numbers which are established when the reconstruction process is carried out.

After the reconstruction process, the contents of the tape library data are erased and rewritten according to the managed contents. As a result, the memory capacity will not be unduly consumed, but will effectively be used to store the tape library data.

Figures 9A, 9B:
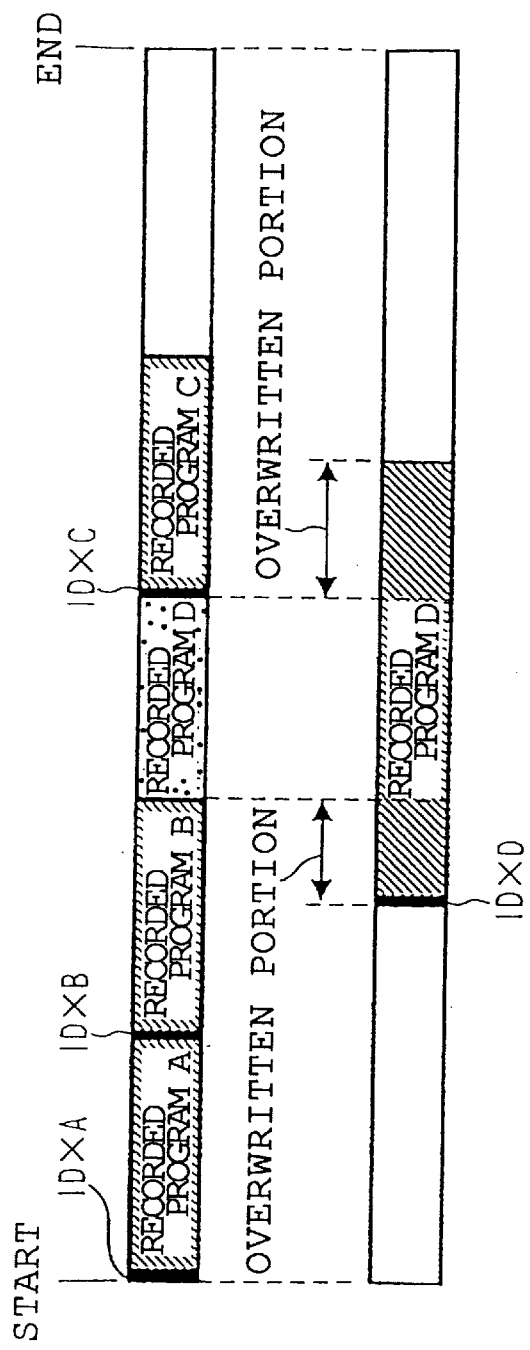
FIGS. 9A and 9B are diagrams illustrative of the manner in which a recorded program partly overwritten on a magnetic tape is handled when the reconstruction process is carried out.

FIG. 9A shows programs A, B, D, C recorded successively on the magnetic tape in a video cassette from the tape start position. As shown in FIG. 9B, the recorded program D has front and rear portions erased by being overwritten by the recorded programs B, C.

When programs are subsequently recorded so as to overwrite a recorded program, such as the recorded program D, the user knows in most cases that the recorded program D is erased. Therefore, it can be assumed that the recorded program D is no longer necessary for the user. It is preferable from the standpoint of actual video cassette use that the unnecessary recorded program be deleted from the data management for recorded program information and not displayed in the EPN.

In this embodiment, the reconstruction process may be carried out on such a video cassette thereby to delete the unnecessary recorded program D shown in FIG. 9A from the data management.

In this case, an index signal IDX·D of the recorded program D has been erased by being overwritten by the recorded program B, and does not exist in the recorded state of the video cassette shown in FIG. 9A.

If the reconstruction process is effected on the recorded program information of such a video cassette according to the steps described above with reference to FIGS. 8A–8C, then when the tape is fed fast forward to scan the recorded programs, since the index signal IDX·D of the recorded program D is not detected, no data of the recorded program is registered in the reconstruction data associated table A11.

Therefore, in the data management based on the reconstruction data associated table A11 after the reconstruction process, the recorded program D is handled as being not recorded on the tape, and information relative to the recorded program D is not displayed in the EPN.

According to the present invention, as described above, in managing recorded programs as by displaying a program guide, for example, the recorded programs are identified on the basis of identification data for tape and program numbers recorded on a tape-like recording medium in superimposed relation to video signals thereof, and identification data for tape and program numbers stored as tape library data in a memory.

In the above management scheme, different tape numbers may inevitably be established for recorded programs in one video cassette, but cannot be rewritten after being recorded as they are superimposed upon the video signals. It has therefore been considered difficult to effect a reconstruction process for positively correcting data to unify and manage the tape numbers for the recorded program in the same video cassette. When the reconstruction process is carried out on tape numbers according to the present invention, however, a common tape number may be established and managed for recorded programs with respect to which different tape numbers have been established in the same video cassette.

When program guide information is presented on the basis of program information that has been managed by the reconstruction process according to the present invention, the user is provided with guide information in conformity with an actual state in which the programs are recorded in the video cassette. Consequently, the program guide information can efficiently be used as a recorded program guide function.

In the reconstruction process, the reconstructive numbers are established and associated with original tape numbers which are established when programs are recorded, so that reconstructed tape library data can be managed efficiently and simply. Because the stored tape library data are updated according to the data management scheme after the reconstruction process, the consumption of the memory capacity for the tape library data is reduced, and the memory capacity can effectively be used.

The present invention is not limited to the details of the embodiment, but may be modified in various ways. For example, the steps of the cue-up and playback process and the reconstruction process shown in FIGS. 6 and 8A–8C may be modified otherwise.

The EPN displayed as the program guide is not limited to the details shown in FIG. 2, but may be modified to have various other details.

What is claimed is:

1. A recorded program information managing apparatus for managing information relative to programs recorded on magnetic tapes, comprising:

recorded program information establishing means for establishing, as recorded program information, at least recording medium number information indicative of different recording medium numbers assigned respectively to magnetic tapes which record programs thereon, and program number information indicative of different program numbers assigned respectively to the recorded programs in depending relation to the recording medium numbers;

recording control means for recording, as identification information of the recorded programs, at least the recording medium number information and the program number information which are established by said recorded program information establishing means on the magnetic tapes in superimposed relation to video signals of the recorded programs;

storage means for storing at least the recording medium number information and the program number information as recorded program information relative to the recorded programs recorded on the magnetic tapes; and reconstruction means for executing a reconstruction process to unify and manage the recording medium number information of recorded programs on a single magnetic tape if at least different recording medium numbers have already been established with respect to the recorded programs on said single magnetic tape;

said reconstruction means comprising:

reconstructive number establishing means for establishing reconstructive recording medium number information indicative of a reconstructing recording medium number with respect to a magnetic tape to be processed by said reconstruction process;

identification information extracting means for extracting recording medium number information and program number information with respect to each of the recorded programs from video signals reproduced from said magnetic tape to be processed by said reconstruction process;

storage control means for storing the recording medium number information extracted with respect to each of the recorded programs by said identification information extracting means in association with said reconstructive recording medium number information in a reconstructed data area of said storage means; and program information managing means for rewriting the recording medium number information of programs recorded on the magnetic tape into said reconstructive recording medium number information by referring to contents stored in said reconstructed data area.

2. A recorded program information managing apparatus according to claim 1, characterized in that said reconstructive number establishing means is capable of establishing reconstructive program number information indicative of reconstructive program numbers to be assigned to respective recorded programs in depending relation to said reconstructive recording medium numbers, that said storage control means stores the recording medium number information and the program number information extracted with respect to each of the recorded programs by said identification information extracting means in association with said reconstructive recording medium number information and said reconstructive program number information in the reconstructed data area of said storage means, and that said program information management means rewrites the recording medium number information and the program number information of programs recorded on the magnetic tape into said reconstructive recording medium number information and said reconstructive program number information by referring to contents stored in said reconstructed data area.

3. A recorded program information managing apparatus according to claim 1, further comprising recorded program information updating means for erasing recorded program information, prior to being processed by said reconstruction process, of recorded programs to be processed by said reconstruction process, from said storage means, and rewriting stored contents of the recorded program information, if necessary, according to contents managed by said program information managing means.

4. A recorded program information managing method of managing information relative to programs recorded on magnetic tapes, comprising the steps of:

establishing, as recorded program information, at least recording medium number information indicative of different recording medium numbers assigned respectively to magnetic tapes which record programs thereon, and program number information indicative of different program numbers assigned respectively to the recorded programs in depending relation to the recording medium numbers;

recording, as identification information of the recorded programs, at least the recording medium number information and the program number information on the magnetic tapes in superimposed relation to video signals of the recorded programs;

storing at least the recording medium number information and the program number information as recorded program information relative to the recorded programs recorded on the magnetic tapes in a predetermined storage area; and executing a reconstruction process to unify and manage the recording medium number information of recorded programs on a single magnetic tape if at least different recording medium numbers have already been established with respect to the recorded programs on said single magnetic tape;

said reconstruction process comprising the steps of:

establishing reconstructive recording medium number information indicative of a reconstructing recording medium number with respect to a magnetic tape to be processed by said reconstruction process;

extracting recording medium number information and program number information with respect to each of the recorded programs from video signals reproduced from said magnetic tape to be processed by said reconstruction process;

storing the recording medium number information extracted with respect to each of recorded programs in association with said reconstructive recording medium number information in a reconstructed data area of said storage area; and rewriting the recording medium number information of programs recorded on the magnetic tape into said reconstructive recording medium number information by referring to contents stored in said reconstructive data area.

5. A recorded program information managing method according to claim 4, wherein said step establishing reconstructive recording medium number information is capable of establishing reconstructive program number information indicative of reconstructive program numbers to be assigned to respective recorded programs in depending relation to said reconstructive recording medium numbers, that said step of storing the recording medium number information extracted with respect to each of the recorded programs stores the recording medium number information and the program number information extracted with respect to each of recorded programs in association with said reconstructive recording medium number information and said reconstructive program number information in the reconstructed data area of said storage area, and that said step of rewriting the recording medium number information of programs rewrites the recording medium number information and the program number information of programs recorded on the magnetic tape into said reconstructive recording medium number information and said reconstructive program number information by referring to contents stored in said reconstructed data area.

6. A recorded program information managing method according to claim 4, further comprising the step of erasing recorded program information, prior to being processed by said reconstruction process, of recorded programs to be processed by said reconstruction process, from said storage area, and rewriting stored contents of the recorded program information, if necessary, according to contents managed by said step of rewriting the recording medium number information of programs recorded on the magnetic tape.

7. A recording and reproducing apparatus having recording and reproducing means for recording and reproducing information on and from magnetic tapes, comprising:

recorded program information establishing means for establishing, as recorded program information, at least recording medium number information indicative of different recording medium numbers assigned respectively to magnetic tapes which record programs thereon, and program number information indicative of different program numbers assigned respectively to the recorded programs in depending relation to the recording medium numbers;

recording control means for controlling said recording and reproducing means to record, as identification information of the recorded programs, at least the recording medium number information and the program number information which are established by said recorded program information establishing means on the magnetic tapes in superimposed relation to video signals of the recorded programs;

storage means for storing at least the recording medium number information and the program number information as recorded program information relative to the recorded prerecorded on the magnetic tapes, so that information relative to programs recorded on the magnetic tapes can be managed; and reconstructing means for executing a reconstruction process to unify and manage the recording medium number information of recorded programs on a single magnetic tape if at least different recording medium numbers have been established with respect to the recorded programs on said single magnetic tape;

said reconstructing means comprising:
  reconstructive number establishing means for establishing reconstructive recording medium number information indicative of a reconstructive recording medium number with respect to a magnetic tape to be processed by said reconstruction process;
  identification information extracting means for extracting recording medium number information and program number information with respect to each of recorded programs from video signals reproduced from said magnetic tape to be processed by said reconstruction process;
  storage control means for storing the recording medium number information extracted with respect to each of the recorded programs by said identification information extracting means in association with said reconstructive recording medium number information in a reconstructed data area of said storage means; and
  program information managing means for rewriting the recording medium number information of programs recorded on the magnetic tape into said reconstructive recording medium number information by referring to contents stored in said reconstructed data area.

8. A recording and reproducing apparatus according to claim 7, wherein said storage means is arranged to store recorded program guide information indicative of predetermined guide information relative to recorded programs in association with the recording medium number information and the program number information, further comprising:
  display means for displaying a program guide for guiding the recorded programs based on the recorded program guide information stored by said storage means.

9. A recording and reproducing apparatus according to claim 7, further comprising:
  cue-up and playback control means for cueing up and playing back a designated recorded program with said recording and reproducing means; and
  wherein said cue-up and playback control means determines whether the recording medium number information and the program number information stored by said storage means and indicative of the designated recorded program are in conformity with the recording medium number information and the program number information extracted from the reproduced video signal of each of the recorded programs recorded on the magnetic tape, and controls said recording and reproducing means to cue-up and play back the recorded program whose information is in conformity with the information stored by said storage means, among the recorded programs recorded on the magnetic tape.

10. A recording and reproducing apparatus according to claim 9, wherein said magnetic tape has predetermined areas which store index signals indicative of start positions of the respective recorded programs, and said cue-up and playback control means control said recording and reproducing means to play back the magnetic tape to detect the index signals to access the start positions of the respective recorded programs and also to play back the magnetic tape to produce reproduced video signals upon which recording medium numbers and program numbers of the recorded programs accessed at the start positions thereof are superimposed, for extracting recording number information and program number information from reproduced video signals of the respective programs recorded on the magnetic tape.

11. A recording and reproducing method of recording and reproducing information on and from magnetic tapes, comprising the steps of:
  establishing, as recorded program information, at least recording medium number information indicative of different recording medium numbers assigned respectively to magnetic tapes which record programs thereon, and program number information indicative of different program numbers assigned respectively to the recorded programs in depending relation to the recording medium numbers;
  recording, as identification information of the recorded programs, at least the recording medium number information and the program number information which are established on the magnetic tapes in superimposed relation to video signals of the recorded programs;
  storing at least the recording medium number information and the program number information as recorded program information relative to the recorded programs recorded on the magnetic tapes in a storage area, so that information relative to programs recorded on the magnetic tapes can be managed; and
  executing a reconstruction process to unify and manage the recording medium number information of recorded programs on a single magnetic tape if at least different recording medium numbers have been established with respect to the recorded programs on said single magnetic tape;

said reconstruction process comprising the steps of:
  establishing reconstructive recording medium number information indicative of a reconstructive recording medium number with respect to a magnetic tape to be processed by said reconstruction process;
  extracting recording medium number information and program number information with respect to each of the recorded programs from video signals reproduced from said magnetic tape to be processed by said reconstruction process storing the recording medium number information extracted with respect to each of recorded programs in association with said reconstructive recording medium number information in a reconstructed data area of said storage area; and rewriting the recording medium number information of programs recorded on the magnetic tape into said reconstructive recording medium number information by referring to contents stored in said reconstructed data area.

12. A recording and reproducing method according to claim 11, wherein said storage area arranged to store recorded program guide information indicative of predetermined program guide information relative to recorded programs in association with the recording medium number information and the program number information, further comprising the step of:

displaying a program guide for guiding the recorded programs based on the recorded program guide information stored in said storage area.

13. A recording and reproducing method according to claim 11, further comprising the step of:

cueing up and playing back a designated recorded program; and wherein said step of cueing up and playing back a designated recorded program determines whether the recording medium number information and the program number information stored in said storage area and indicative of the designated recorded program are in conformity with the recording medium number information and the program number information extracted from the reproduced video signal of each of recorded programs recorded on the magnetic tape, and cues up and plays back the recorded program whose information is in conformity with the information stored by said storage area, among the recorded programs on the magnetic tape.

14. A recording and reproducing method according to claim 13, wherein said magnetic tape has predetermined areas which store index signals indicative of start positions of the respective recorded programs, and said step of cueing up and playing back a designated recorded program plays back the magnetic tape to detect the index signals to access the start positions of the respective recorded programs and also plays back the magnetic tape to produce reproduced video signals upon which recording medium numbers and program numbers of the recorded programs accessed at the start positions thereof are superimposed, for extracting recording number information and program number information from reproduced video signals of the respective programs recorded on the magnetic tape.

* * * * *